US012682287B2

(12) United States Patent
Cheng et al.

(10) Patent No.: US 12,682,287 B2
(45) Date of Patent: Jul. 14, 2026

(54) SYSTEMS AND METHODS FOR IMPLEMENTING AN INTELLIGENT MACHINE LEARNING OPTIMIZATION PLATFORM FOR MULTIPLE TUNING CRITERIA

(71) Applicant: Intel Corporation, Santa Clara, CA (US)

(72) Inventors: Bolong Cheng, San Francisco, CA (US); Olivia Kim, San Francisco, CA (US); Michael McCourt, San Francisco, CA (US); Patrick Hayes, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 18/320,803

(22) Filed: May 19, 2023

(65) Prior Publication Data

US 2023/0325721 A1    Oct. 12, 2023

Related U.S. Application Data

(63) Continuation of application No. 16/895,099, filed on Jun. 8, 2020, now Pat. No. 11,699,098, which is a
(Continued)

(51) Int. Cl.
*G06F 16/81* (2019.01)
*G06F 17/10* (2006.01)
(Continued)

(52) U.S. Cl.
CPC ............. *G06N 20/00* (2019.01); *G06F 17/10* (2013.01)

(58) Field of Classification Search
CPC .......... G06N 20/00; G06N 7/01; G06N 20/20; G06F 17/10
See application file for complete search history.

(56) References Cited

U.S. PATENT DOCUMENTS 9,786,036 B2    10/2017  Annapureddy
10,217,061 B2    2/2019  Hayes et al.
(Continued)

OTHER PUBLICATIONS

United States Patent and Trademark Office, "Non-Final Office Action," issued in connection with U.S. Appl. No. 16/527,348, mailed on Oct. 10, 2019, 12 pages.
(Continued)

*Primary Examiner* — Brandon S Cole
(74) *Attorney, Agent, or Firm* — Hanley, Flight & Zimmerman, LLC

(57) ABSTRACT

Systems and methods for tuning hyperparameters of a model includes: receiving a multi-criteria tuning work request for tuning hyperparameters of the model of the subscriber to the remote tuning service, wherein the multi-criteria tuning work request includes: a first objective function of the model to be optimized by the remote tuning service; a second objective function to be optimized by the remote tuning service, the second objective function being distinct from the first objective function; computing a joint tuning function based on a combination of the first objective function and the second objective function; executing a tuning operation of the hyperparameters for the model based on a tuning of the joint function; and identifying one or more proposed hyperparameter values based on one or more hyperparameter-based points along a convex Pareto optimal curve.

20 Claims, 7 Drawing Sheets

Related U.S. Application Data continuation of application No. 16/696,355, filed on Nov. 26, 2019, now Pat. No. 10,740,695, which is a continuation of application No. 16/527,348, filed on Jul. 31, 2019, now Pat. No. 10,528,891.

(60) Provisional application No. 62/721,718, filed on Aug. 23, 2018.

(51) Int. Cl.

| | | |
|---|---|---|
| *G06N 3/08* | (2023.01) | |
| *G06N 3/084* | (2023.01) | |
| *G06N 20/00* | (2019.01) | |

(56) References Cited

U.S. PATENT DOCUMENTS

| | | | | |
|---|---|---|---|---|
| 10,282,237 | B1 | 5/2019 | Johnson et al. | |
| 10,528,891 | B1 | 1/2020 | Cheng | |
| 10,558,934 | B1 | 2/2020 | Cheng | |
| 10,621,514 | B1 | 4/2020 | Cheng | |
| 10,740,695 | B2 | 8/2020 | Cheng | |
| 11,699,098 | B2 | 7/2023 | Cheng et al. | |
| 2007/0019065 | A1 | 1/2007 | Mizes | |
| 2009/0244070 | A1 | 10/2009 | Mattikalli | |
| 2010/0083196 | A1 | 4/2010 | Liu | |
| 2014/0109123 | A1 | 4/2014 | Balakrishnan | |
| 2014/0172773 | A1 | 6/2014 | Schmidt | |
| 2015/0288573 | A1 | 10/2015 | Baughman | |
| 2017/0213155 | A1* | 7/2017 | Hammond | G06F 8/437 |
| 2017/0372229 | A1* | 12/2017 | Ura | G06N 20/00 |
| 2018/0055394 | A1 | 3/2018 | Sohrabpour | |
| 2018/0129892 | A1 | 5/2018 | Bahl | |
| 2018/0240010 | A1* | 8/2018 | Faivishevsky | G06N 3/08 |
| 2018/0240041 | A1 | 8/2018 | Koch | |
| 2018/0336493 | A1* | 11/2018 | Hayes | G06N 20/20 |
| 2018/0356949 | A1 | 12/2018 | Wang | |
| 2019/0129026 | A1* | 5/2019 | Sumi | A61B 6/00 |
| 2019/0129764 | A1* | 5/2019 | Johnson | G06N 5/01 |
| 2019/0377984 | A1 | 12/2019 | Ghanta | |
| 2020/0126636 | A1* | 4/2020 | Yu | G16B 40/20 |

OTHER PUBLICATIONS

United States Patent and Trademark Office, "Non-Final Office Action," issued in connection with U.S. Appl. No. 16/527,356, mailed on Oct. 11, 2019, 15 pages.

United States Patent and Trademark Office, "Notice of Allowance," issued in connection with U.S. Appl. No. 16/527,348 mailed on Nov. 1, 2019, 5 pages.

United States Patent and Trademark Office, "Notice of Allowance," issued in connection with U.S. Appl. No. 16/527,356, mailed on Nov. 1, 2019, 5 pages.

United States Patent and Trademark Office, "Corrected Notice of Allowability," issued in connection with U.S. Appl. No. 16/527,356, mailed on Dec. 12, 2019, 2 pages.

United States Patent and Trademark Office, "Non-Final Office Action," issued in connection with U.S. Appl. No. 16/696,575, mailed on Jan. 31, 2020, 17 pages.

United States Patent and Trademark Office, "Non-Final Office Action," issued in connection with U.S. Appl. No. 16/696,355, mailed on Feb. 10, 2020, 16 pages.

United States Patent and Trademark Office, "Notice of Allowance," issued in connection with U.S. Appl. No. 16/696,575, mailed on Feb. 26, 2020, 5 pages.

United States Patent and Trademark Office, "Final Office Action," issued in connection with U.S. Appl. No. 16/696,355, mailed on Mar. 2, 2020, 22 pages.

United States Patent and Trademark Office, "Notice of Allowance," issued in connection with U.S. Appl. No. 16/696,355, mailed on Mar. 12, 2020, 12 pages.

United States Patent and Trademark Office, "Corrected Notice of Allowability," issued in connection with U.S. Appl. No. 16/696,355, mailed on May 6, 2020, 8 pages.

United States Patent and Trademark Office, "Non-Final Office Action," issued in connection with U.S. Appl. No. 16/895,099, mailed on Apr. 20, 2022, 10 pages.

United States Patent and Trademark Office, "Final Office Action," issued in connection with U.S. Appl. No. 16/895,099, mailed on Oct. 26, 2022, 26 pages.

United States Patent and Trademark Office, "Notice of Allowance," issued in connection with U.S. Appl. No. 16/895,099, mailed on Feb. 27, 2023, 5 pages.

\* cited by examiner

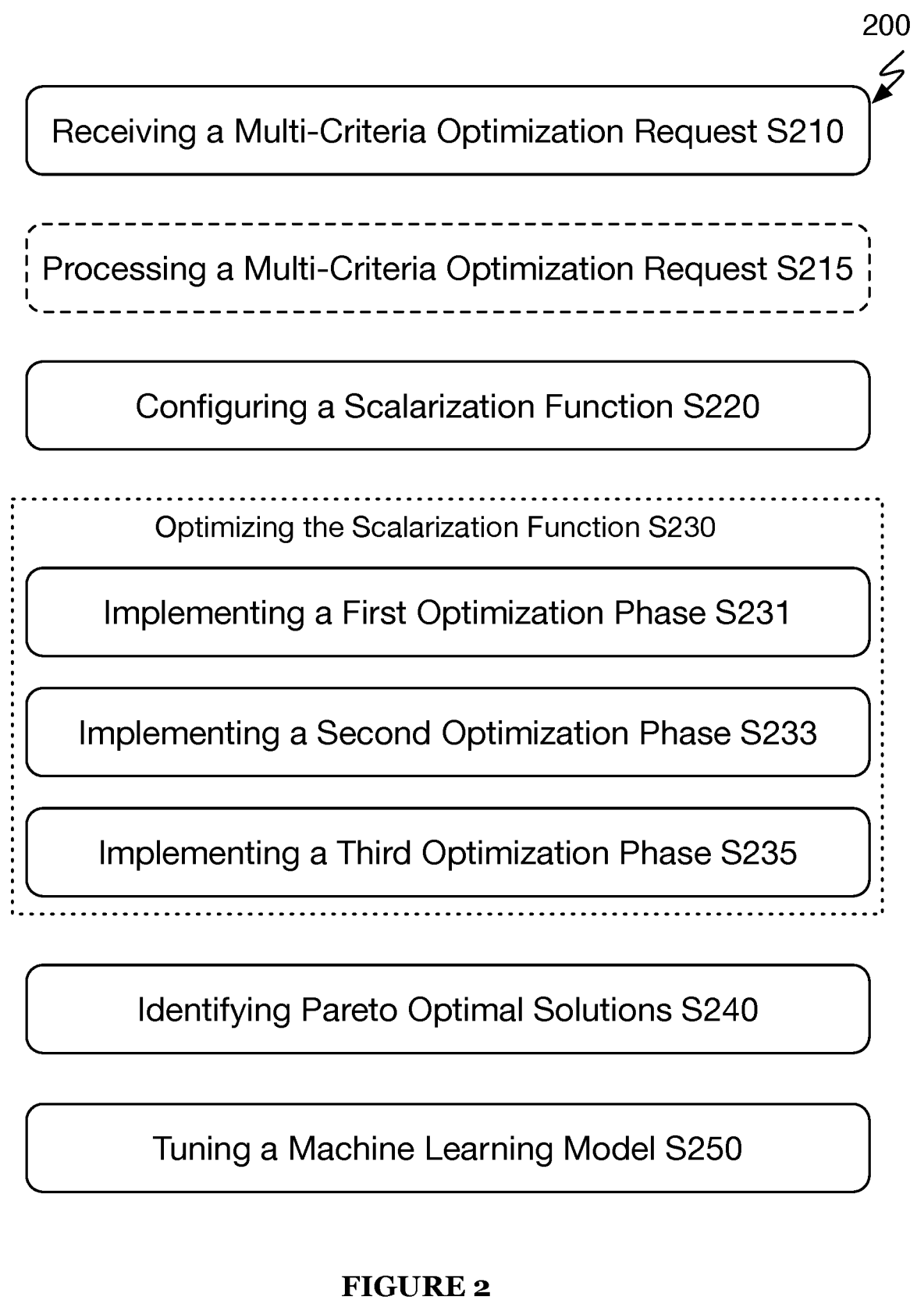

200

Receiving a Multi-Criteria Optimization Request S210

Processing a Multi-Criteria Optimization Request S215

Configuring a Scalarization Function S220

Optimizing the Scalarization Function S230

Implementing a First Optimization Phase S231

Implementing a Second Optimization Phase S233

Implementing a Third Optimization Phase S235

Identifying Pareto Optimal Solutions S240

Tuning a Machine Learning Model S250

FIGURE 2

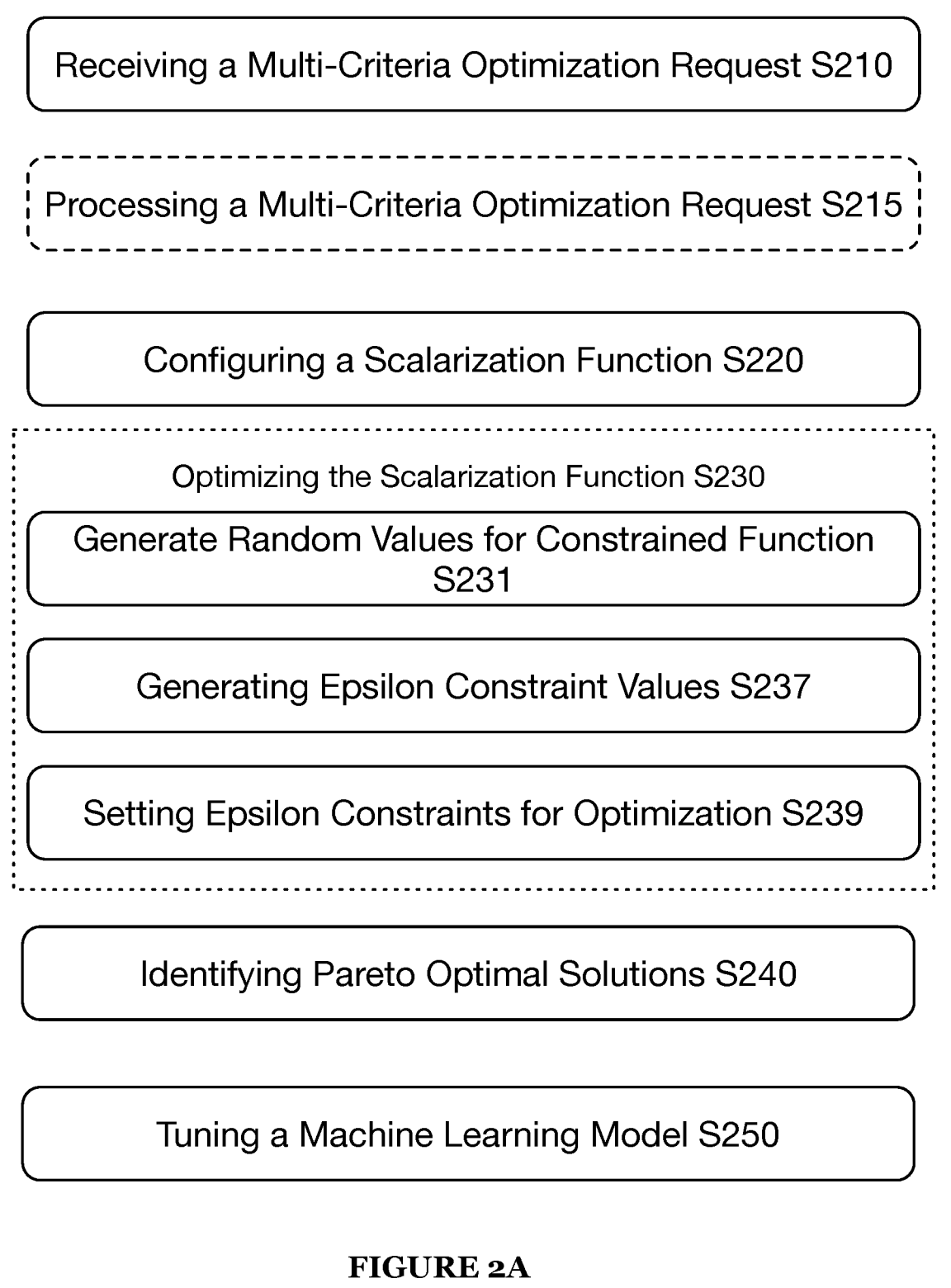

Receiving a Multi-Criteria Optimization Request S210

Processing a Multi-Criteria Optimization Request S215

Configuring a Scalarization Function S220

Optimizing the Scalarization Function S230

Generate Random Values for Constrained Function S231

Generating Epsilon Constraint Values S237

Setting Epsilon Constraints for Optimization S239

Identifying Pareto Optimal Solutions S240

Tuning a Machine Learning Model S250

FIGURE 2A

SYSTEMS AND METHODS FOR IMPLEMENTING AN INTELLIGENT MACHINE LEARNING OPTIMIZATION PLATFORM FOR MULTIPLE TUNING CRITERIA

CROSS-REFERENCE TO RELATED APPLICATIONS

This patent arises from a continuation of U.S. patent application Ser. No. 16/895,099 (now U.S. Pat. No. 11,699, 098), which is titled "SYSTEMS AND METHODS FOR IMPLEMENTING AN INTELLIGENT MACHINE LEARNING OPTIMIZATION PLATFORM FOR MULTIPLE TUNING CRITERIA," and which was filed on Jun. 8, 2020, which is a continuation of U.S. patent application Ser. No. 16/696,355 (now U.S. Pat. No. 10,740,695), which is titled "SYSTEMS AND METHODS FOR IMPLEMENTING AN INTELLIGENT MACHINE LEARNING OPTIMIZATION PLATFORM FOR MULTIPLE TUNING CRITERIA," and which was filed Nov. 26, 2019, which is a continuation of U.S. patent application Ser. No. 16/527,348 (now U.S. Pat. No. 10,528,891), which is titled "SYSTEMS AND METHODS FOR IMPLEMENTING AN INTELLIGENT MACHINE LEARNING OPTIMIZATION PLATFORM FOR MULTIPLE TUNING CRITERIA," and which was filed Jul. 31, 2019, which claims the benefit of U.S. Provisional Patent Application No. 62/721,718, which is titled "SYSTEMS AND METHODS FOR IMPLEMENTING AN INTELLIGENT MACHINE LEARNING OPTIMIZATION PLATFORM FOR MULTIPLE TUNING CRITERIA" and filed on Aug. 23, 2018. Priority to U.S. patent application Ser. No. 16/895,099, U.S. patent application Ser. No. 16/696,355, U.S. patent application Ser. No. 16/527, 348, and U.S. Provisional Application No. 62/721,718 is claimed. U.S. patent application Ser. No. 16/895,099, U.S. patent application Ser. No. 16/696,355, U.S. patent application Ser. No. 16/527,348 and U.S. Provisional Application No. 62/721,718 are hereby incorporated herein by reference in their respective entireties.

TECHNICAL FIELD

The inventions relate generally to the computer optimization and machine learning fields, and more specifically to a new and useful application program interface and intelligent hyperparameter optimization in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained using data samples as machine learning training input and based on the hyperparameters of the machine learning model set prior to the training of the model. As referenced in passing the hyperparameters of the machine learning models are parameters whose values are set prior to the commencement of the machine learning process rather than derived by the machine learning model during training. Example include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively enable optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

BRIEF DESCRIPTION OF THE FIGURES

FIG. 2 illustrates a method for multi-criteria optimization m accordance with one or more embodiments of the present application;

FIG. 2A illustrates a variant method for multi-criteria optimization in accordance with one or more embodiments of the present application;

DESCRIPTION OF THE PREFERRED EMBODIMENTS

Figure 1:
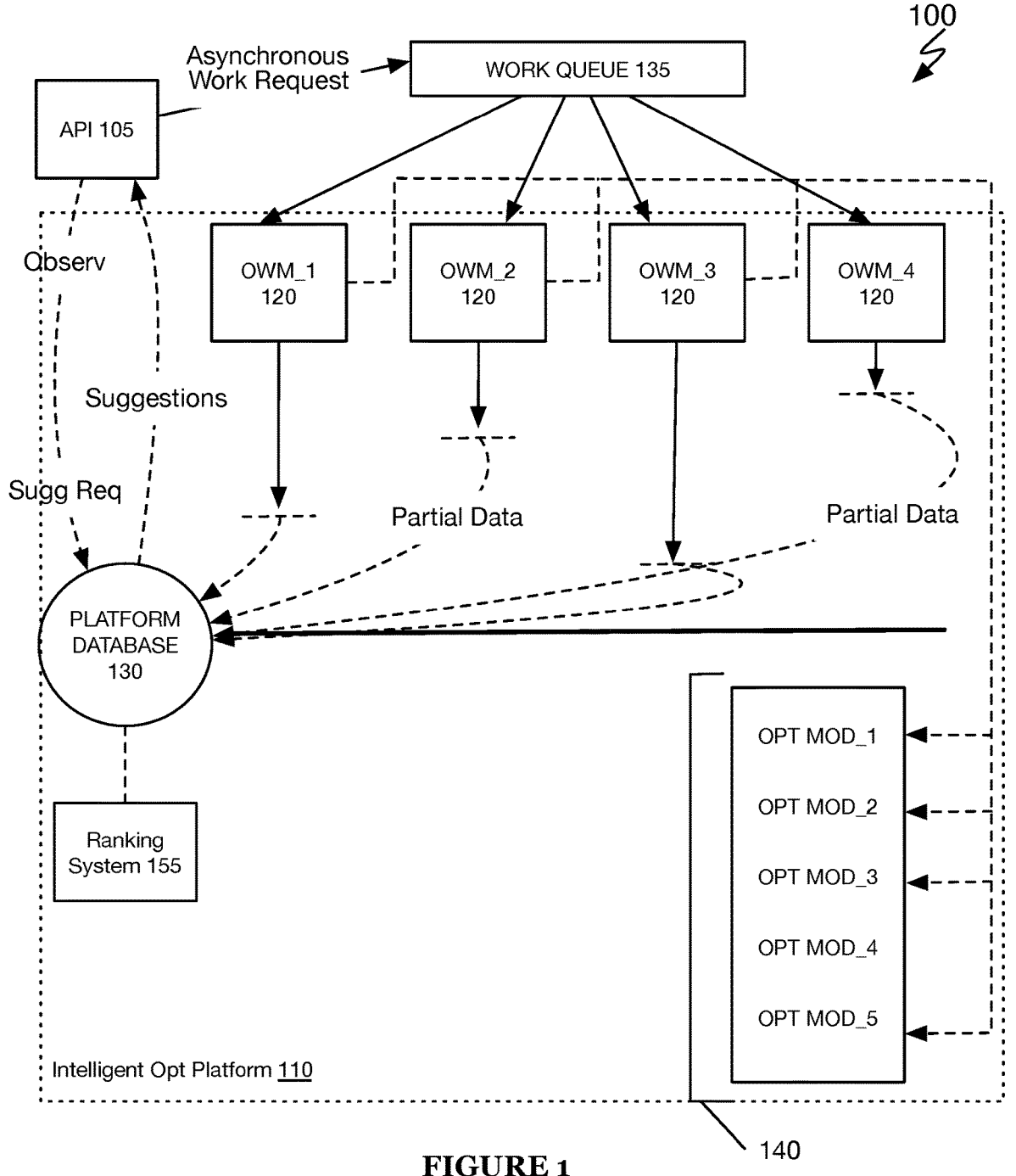
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing machine learning models tend to lack in predictive performance as well as speed in computation due to a lack of optimal hyperparameters used in the machine learning models during training. The lack of optimized hyperparameters well-suited to an underlying computing problem or the like adversely affect the computational capabilities of the machine learning model, in that, the resulting predictions or solutions of the model may not be accurate and the speed of computation of the machine learning model may be slow because the un-optimized or poorly optimized hyperparameters of the model may result in an increased workload (e.g., increased required computer processing, increased required data storage, etc.) to the computing system implementing the model and thereby resulting in many efficiencies therein.

Additionally, even in the circumstance that an attempt is made to optimize some of the hyperparameters of a machine learning model, the attempt to optimize the hyperparameters may fail due to many common optimization errors including: using inappropriate metrics and assumptions to test hyperparameters of an associated machine learning model or the like; overfitting a machine learning model during training that often results in a poor fit of the model to out of sample data or unseen data; using too few hyperparameters and failing to optimize all hyperparameters of a machine learning model; unskilled or improper hand-tuning, which is a highly inefficient optimization strategy at which humans are poor at performing high dimensional, non-convex optimization; grid searching over a space of possible hyperparameters which may grow the number of times a machine learning model must be evaluated due to an increase in dimensionality (i.e., increased hyperparameters); random searching which uses no intelligence in the optimization method and may result in unnecessarily high variance.

Accordingly, unintelligent optimization attempts of hyperparameters (or other model parameters) may result in high computational costs (e.g., high computer processing resources expenditures, etc.).

The embodiments of the present application, however, provide an intelligent optimization platform that functions to optimize hyperparameters and/or parameters of any type of model with significantly fewer evaluation thereby saving computational resources while greatly improving an overall performance of a model. In embodiments of the present application, the intelligent optimization platform includes an ensemble of parameter optimization models, which may include a combination of several distinct machine learning models and Bayesian optimization algorithms that may work in selective combinations to expediently tune hyperparameters or various parameters of complex external systems, simulations, and models.

Further, the embodiments of the present application include an intuitive and simplified Application Programming Interface (API) that enables users and/or developers to easily configure a work request, such as a hyperparameter optimization work request. A hyperparameter optimization work request as referred to herein generally relates to a request to optimize one or more hyperparameters of a model. The hyperparameter optimization work request may include an identification of the hyperparameters a user desires to optimize together with constraints or parameters required for experimenting or performing optimization trials using the system and/or methods described herein. The optimization work request may generally be generated using an API of the system 100, as described below. In a preferred embodiment, the optimization work request functions to trigger an operation of the intelligent optimization platform performing computations using the hyperparameters of the optimization work request. Additionally, in embodiments of the present application, using a limited number of simplified API calls, it is possible to integrate the sophisticated ensemble of Bayesian optimization techniques of the intelligent optimization platform to augment an existing machine learning pipeline.

Collaboratively, the intelligent optimization platform preferably functions to improve the computational capabilities of a machine learning model, such that the machine learning model performs at high levels of accuracy and further, computes predictions, suggestions, and other outcomes faster (e.g., up to one hundred times faster or more improvement in machine learning models, etc.) than un-optimized or poorly optimized machine learning models or other models. This, in turn, improves the functionality and operational speed and efficiency of the underlying computing system executing the machine learning model or other model.

1. System for Implementing an Intelligent API

As shown in FIG. 1, a system 100 includes an intelligent application program interface (API) 105, an intelligent model optimization platform 110, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features of a model, architecture of a model, and hyperparameters of a model using an ensemble of Bayesian optimization techniques, as described in U.S. patent application Ser. No. 15/977,168, which is incorporated herein in its entirety by this reference.

The system 100 functions to implement an intelligent Application Program Interface (API) 105, as described in U.S. Patent Application No. 62/578,886, which is incorporated herein in its entirety by this reference, for interacting and implementing complex optimization trials via the remote intelligent optimization platform 110. The API 105 may be specifically designed to include a limited number of API endpoints that reduce of complexity in creating an optimization work request, implementing optimization trials using the work request data, obtaining suggestions and/or results of the optimization trials, and potentially implementing an optimization feedback loop until a suitable optimization of an objective function of the work request is achieved in a minimal amount of time. The optimization work request, as referred to herein, generally relates to an API request that includes one or more hyperparameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

Figure 4:
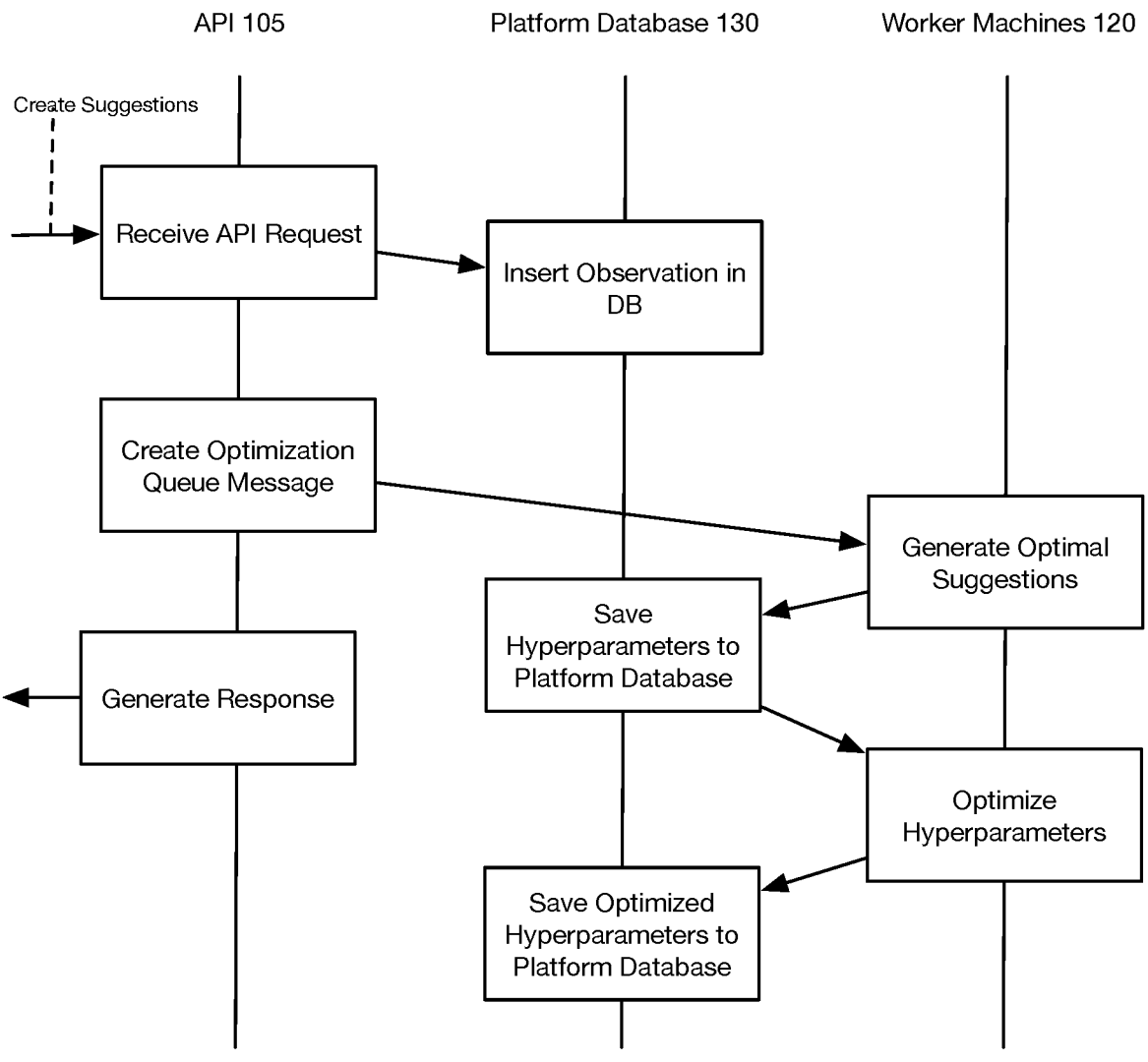
FIG. 4 illustrates schematic representation of a mixed system and process flow for implementing an intelligent optimization platform in accordance with one or more embodiments of the present application.

The API 105 may additionally be configured with logic that enables the API 105 to intelligently parse optimization work request data and/or augment the optimization work request data with metadata prior to passing the optimization work request to the shared work queue 135 of the intelligent optimization platform 110. As shown in FIG. 4, a mixed system and process flow is provided that illustrates an example interactions between the API 105 and one or more components of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Figure 3:
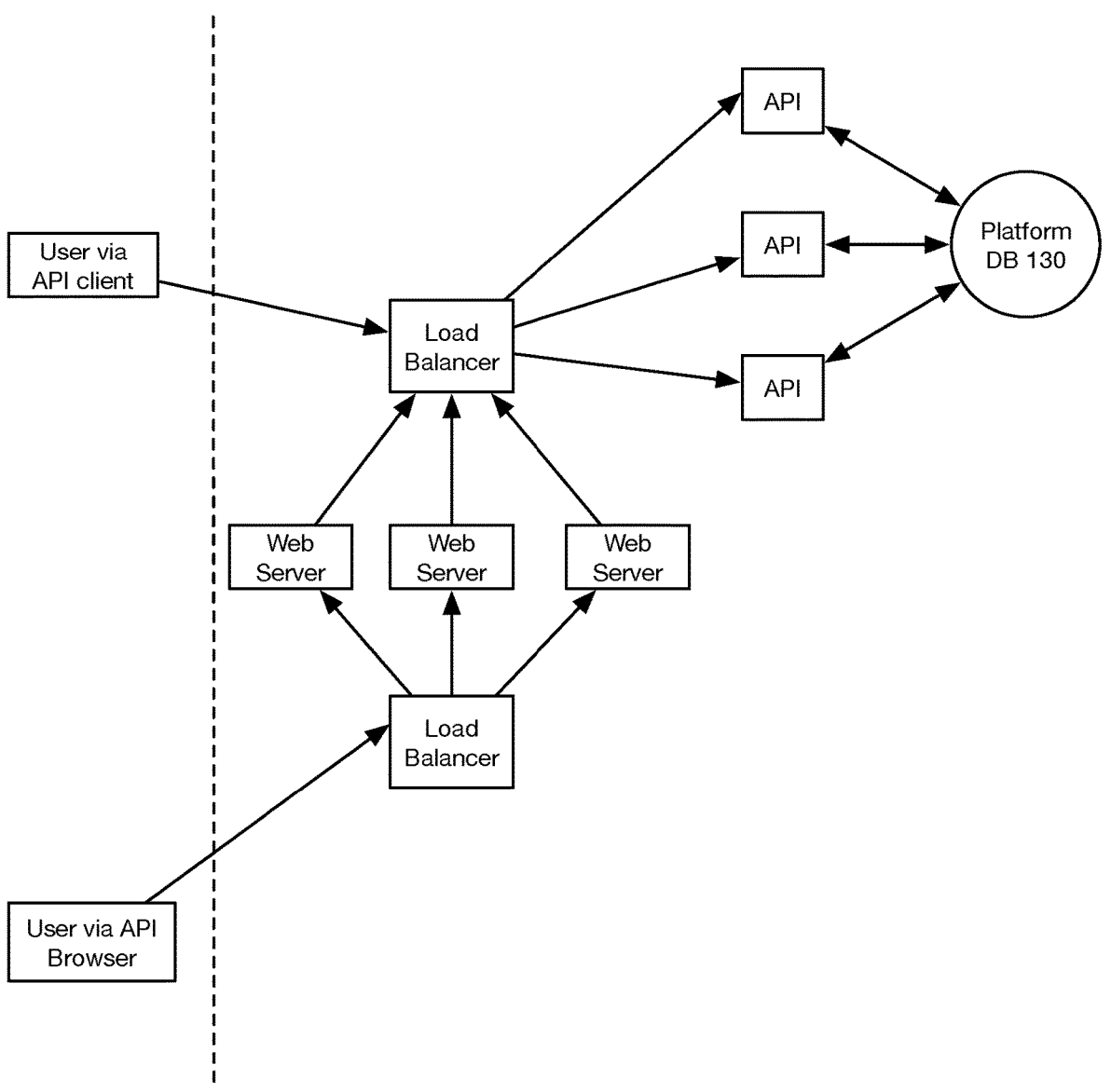
FIG. 3 illustrates a schematic representation of a system for implementing an intelligent API in accordance with one or more embodiments of the present application.

As shown by way of example in FIG. 3, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform 110. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 preferably includes a plurality of disparate optimization models that operate to optimize hyperparameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

A first example intelligent queue working machine may function to implement Modelfit or Hyperopt that typically functions to tune one or more of the hyperparameters of the optimization models of the ensemble concurrently with the processing of the optimization work requests received via the API 105. In one implementation, Modelfit or Hyperopt may be used to tune hyperparameters of one of the optimization models of the ensemble 140. After receiving a set of observations based on the suggestions for the set of hyperparameters, the first queue worker machine may implement Modelfit or Hyperopt to model fit the hyperparameters of the selected optimization models in order to generate improved and new values for the set of hyperparameters via Nextpoints or the like. A queue worker implementing Nextpoints may function to predict or suggest a new set of suggestions that include new parameter values for a given model. In some embodiments, the first queue worker machine may function to optimize the hyperparameters of the selected optimization models based on an evaluation a set of observations returned by a user.

A second example intelligent queue working machine may function to implement Nextpoints that typically functions to generate or suggest new, optimized values for the hyperparameters of the optimization work request. Accordingly, such intelligent queue working machine may function to select one or more of the optimization models of the ensemble 140, such as one or more machine learning models, for generating the new, optimized hyperparameter values.

A third example intelligent queue working machine may function to implement an Importance algorithm that typically functions to judge or determine an importance of the hyperparameters submitted with the optimization work request (e.g., hyperparameters of an external model). This example intelligent queue worker machine may additionally function to analyze and determine an importance of features, hyperparameters, and architectures of the optimization models with respect to a given optimization work request; meaning the identified importance hyperparameters, features, or the like may have a significant impact on an account of a suggestion or generated hyperparameter values. Accordingly, the intelligent queue worker machine of such example may function to recognize different hyperparameters and/or features of an optimization model as being important and non-important based on the optimization work request data (e.g., based on the hyperparameters to be optimized). Thus, the intelligent queue worker machine may function to assign or attribute distinct importance values to the hyperparameters and/or features of the optimization models so that these hyperparameters and the like may be ranked and considered with greater weight in a correlated process, such as re-tuning via Hyperopt or the like.

It shall be noted that the plurality of intelligent optimization worker machines 120 may not be limited to the above-noted examples, but rather is an extensible group of intelligent machines that may be modified to include additional and/or different intelligent worker machines.

The platform database 130 functions to collect and stores any or all values generated by the system 100 including values generated when executing an optimization work request by the intelligent optimization platform 110. Specifically, each of the plurality of intelligent queue worker machines may function to store within the platform database 130 optimized hyperparameter values, optimized hyperparameter values of an optimization work request, suggestions, surrogate models, partial information responses, and the like. The API 105 may be operable communication with the platform database 130 via a communication network and may function to pull suggestions and/or response data via an API call or request.

The machine learning models, optimization models, and/or the ensemble of machine learning models may employ any suitable optimization algorithms and/or machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate hyperparameter value data points may perform.

The system 100 may also implement a ranking system 155 that functions to rank multiple suggestions for a given optimization work request (or across multiple optimization work requests for a given user) such that the suggestions having hyperparameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

2. Method for Multiple Criteria Optimization Using an Intelligent Optimization Platform 2.1 Convex Frontier As shown in FIG. 2, a method 200 for multi-criteria optimization by implementing an intelligent optimization platform includes receiving an optimization work request S210, configuring a scalarized function for multiple objective functions of a machine learning model S220, optimizing the scalarized function S230, identifying Pareto optimal solutions for the scalarized function of the machine learning model S240, and tuning and/or implementing the machine learning model S250.

The method 200 generally functions to enable a generation of Pareto optimal solution sets for optimizing competing performance objective functions of a machine learning model. For instance, it may be an objective or desire to improve, at a same time, one or more of an accuracy, an error rate, validation loss, sparsity, an efficiency (speed of prediction or inference), and/or the like for a given machine learning model. However, in many instances, if one performance objective, such as accuracy is improved, a second objective, such as predictive efficiency or speed, may be diminished or degraded for the machine learning model. Thus, in such instances, there may be significant tradeoffs in performance of disparate objectives when they are optimized independently.

Accordingly, in one or more embodiments, the method 200 may function to recognize competing performance objectives of a machine learning model in which an apparent inverse or divergent optimization relationship may exist between two distinct and/or competing performance objectives of the machine learning model. The method 200 may function to overcome this divergent optimization scenario by implementing one or more techniques that enables a joint optimization of competing performance objectives of a machine learning model that further enables a determination of hyperparameter values that optimizes both of the competing objective functions and consequently, the subject machine learning model along both of the competing performance objectives, as described in more detail below.

Additionally, the method 200 may configure an intelligent optimization platform, in response to input values provided via an intelligent Application Program Interface (API), such that the intelligent optimization platform generates multiple Pareto optimal suggestions for hyperparameter values of competing objective functions of a scalarized function. In the context of the present application, a Pareto optimal solution for a given scalarized function and/or convex combination for a machine learning model generally relates to a solution that is not strictly more optimal than another Pareto optimal solution. That is, the Pareto optimal solutions identified along the Pareto-efficient frontier define a set of solutions where a first and second competing objective may be improved without sacrificing either objective.

S210, which includes receiving an optimization work request, functions to receive an optimization work request comprising a multi-criteria optimization work request via an intelligent APL The multi-criteria optimization work request may be referred to herein as a multi-criteria tuning work request. Preferably, a multi-criteria optimization work request relates to an optimization request made to the intelligent optimization platform that requires the optimization of two or more criterion and/or two or more objective functions (or metrics) of a single machine learning model rather than an optimization of one objective function of a single model. The intelligent API may be implemented as a client application on a client device, such as a web browser, or any suitable interface accessible to a remote user system. Within the intelligent API, the remote user may be able to create or define the multi-criteria optimization work request (or experiment) by providing one or more details of the objective functions or performance objectives that a user desires to optimize, hyperparameters and/or other features of machine learning model along with constraints (e.g., optimization budgets, bounds, etc.) for performing the optimization trials by the intelligent optimization platform.

Accordingly, in some embodiments, a multi-criteria optimization work request may include an identification of at least a first metric (e.g., predictive accuracy) of a machine learning model and a second metric (e.g., predictive efficiency/speed) of the machine learning model that a user desires to optimize. In such embodiments, each of the first metric and the second metric may be represented as a two-dimensional objective function, e.g., $f_1(x, y)$ and $f_2(x, y)$, respectively. In one example, the variables x and y of each of the objective functions $f_1$ and $f_2$ represent prospective objective function values, which may both take values in a range in the continuous interval of 0 to 1 (i.e., [0, 1]), and "x" and "y" may represent possible hyperparameter values that may operate to optimize $f_1$ and $f_2$, respectively. It shall be noted that, while in a preferred embodiment, the method 200 functions to implement two-dimensional objective functions, any value of multidimensional objective functions including, but not limited to, three-dimensional objective functions (e.g., x, y, z) may be implemented.

Optionally, S215, which includes preprocessing a multi-criteria optimization work request, functions to perform a preliminary evaluation of the two or more objective functions of the multi-criteria optimization work request to determine whether the two or more objective functions for a given machine learning model compete or diverge in performance when provided a random sample of objective function values for each of the two or more objective functions. In some embodiments, the random values for each of the two or more objective functions may be generated using a low-discrepancy optimization source that may function to populate and/or compute random possible values for each of the functions.

Accordingly, S215 may function to validate whether the objective functions identified within an optimization work request compete. That is, in some embodiments, S215 may function to validate the divergence or competition between distinct objective functions of a given model based on similarities or differences in the outputs of the distinct objective functions based on similar or same input. The input into the objective functions may be selected from possible hyperparameter values for each of the distinct objectives. In one or more embodiments, if S215 determines that two or more of the objective functions compete, S215 may function to trigger a signal for switching or selecting an optimization mode of an intelligent optimization platform that performs an optimization of the contending objective functions, as described herein.

S220, which includes computing a new joint objective function based on the two or more competing objective functions, preferably functions to generate a scalarized function based on the two or more competing objective functions identified in the multi-criteria optimization work request. As referred to herein, a scalarization of the two or more competing objective functions preferably relates to a creation of a single, joint objective function that combines the two or more competing objective functions of a given model in a manner that enables a joint and/or simultaneous optimization of each of the two or more competing objective functions using a single equation.

Referring again to the example above, the two example competing objective functions, $f_1(x, y)$ and $f_2(x, y)$, maybe scalarized into a single, joint objective function represented as g $(x, y)=\lambda*f_1(x, y)+(1-\lambda)*f_2(x, y)$, where the new, joint objective function that is optimized may be g $(x, y)$. Effectively, the scalarization combines at least two two-dimensional competing objective functions into a single, combined convex combination having two dimensions. The convex combination preferably defines an interplay between the two or more competing objective functions. Specifically, the interplay between the two or more competing objective functions revealed by the convex combination function may include a Pareto optimal solution along a frontier curve of points (i.e., possible solutions to the scalarized function) having generally a convex shape. Accordingly, the scalarized function g may sometimes be referred to herein as a convex combination of $f_1$ and $f_2$. Still with respect to such example, a weighting or a tuning factor represented by lambda ($\lambda$) may be constrained as follows: $0<\lambda<1$, in some embodiments. The lambda value $\lambda$, may function to set a hyperplane and/or direction of optimization. The lambda values may generally enable a sweeping search for Pareto optimal values or define regions of search. Accordingly, lambda may function as a weighting value that may enable greater or lesser optimization emphasis of either $f_1$ or $f_2$ when its value is increased or decreased. For example, in the scalarized function, g $(x, y)=\lambda*f_1(x, y)+(1-\lambda)*f_2(x, y)$, a larger lambda value may indicate a greater emphasis on the objective function $f_1$ and a lesser emphasis on second objective function $f_2$. Conversely, a smaller lambda value may indicate a lesser emphasis on $f_1$ and a greater emphasis on $f_2$. Accordingly, during an optimization and/or a tuning of the scalarized function as described in more detail in S230, the method 200 may function to adjust values for k, together with providing values for "x" and "y".

Once a scalarized function is defined for the two or more competing objective functions of a machine learning model, S220 may function to provide the scalarized function as optimization input into the one or more optimization sources of the intelligent optimization platform. That is, in one or more embodiments, the intelligent optimization platform may function to optimize the objective functions of the scalarization g $(x, y)$. For instance, S220 may function to perform and/or execute tuning operations that operate to identify potential hyperparameter values (i.e., "x" and "y") for a given scalarized function, as described in U.S. Pat. Nos. 10,217,061 and 10,282,237, which are both incorporated herein in their entireties by this reference.

S230, which includes optimizing the scalarized function, functions to configure the optimization settings of the intelligent optimization platform to enable optimization of the scalarized function for optimizing a given machine learning model. In some embodiments, a basic configuration of the intelligent optimization platform includes settings for optimization of a single objective function that may typically be a two-dimensional objective function. However, in the circumstances in which a multi-criteria optimization work request is received or detected (e.g., S215), S230 may function to switch or convert an optimization mode of the intelligent optimization platform from a first optimization mode (e.g., for optimizing a single objective function) to a second optimization mode for optimizing a generated scalarization function based on a multi-criteria optimization work request and/or based on a received optimization mode selecting or switching signal (as provided by S215).

S230 may additionally or alternatively include S231, which includes implementing a first optimization phase of the objective functions of the scalarized function of a machine learning model, functions to provide one or more parameters of the scalarized function as input into a first optimization source of the intelligent optimization platform. For instance, S231 may function to provide a minimum and maximum value for each of the two objective functions that define the scalarized function. In this first optimization phase, S231 preferably functions to explore a number of possible values for the objective functions of the scalarized function bounded between an upper and lower bound defined in the multi-criteria optimization work request. That is, S231 may function to (randomly) populate a field of potential values for each of the objective functions of the scalarized function according to one or more predetermined evaluation or testing constraints.

Accordingly, S231 may function to allocate a first portion (e.g., 20% of optimization budget) of an optimization budget (as further defined in the multi-criteria optimization work request) to a low-discrepancy optimization source or the like of the intelligent optimization platform. In turn, the low-discrepancy optimization source may function to generate random values for the objective functions (e.g., values of x and y for g $(x, y)$) of the scalarized function that, in some embodiments, may be represented along a two-dimensional plane $(f_1-f_2)$, as shown by example, in FIG. 5. A random distribution of values for the objective functions of the scalarized function may, therefore, be identified in S231.

S230 may additionally or alternatively include S233, which includes implementing a second optimization phase of the objective functions of the scalarized function, functions to provide the scalarized function (as defined in S220) as input into a second optimization source of the intelligent optimization platform. In this second optimization phase, S233 may function to optimize values of the objective functions of the scalarized function by incrementally adjusting the scalarized function by changing a lambda value. That is, in one example, S233 may function to incrementally adjust values of lambda, k, in a sweeping fashion (or any suitable manner) between the constraints of 0 and 1 to generate Pareto optimal solutions sets along a Pareto-efficient frontier that may be illustrated as a convex frontier. In such example, as a lambda value of the scalarized function is incrementally adjusted or changed, S230 may function to use the second optimization source to identify and/or generate optimal hyperparameter values for the scalarized function at each given lambda setting and/or value. In this example, S230 may function to test each of the random objective function values generated by the low-discrepancy optimization source or the like within a space or region defined by a selected lambda value.

In this second optimization phase, S233 may first function to allocate a second portion (e.g., 60% of optimization budget) of an optimization budget to the second optimization source of the intelligent optimization. Preferably, S233 allocates a larger portion of the optimization budget to the second optimization phase relative to the first optimization phase (and a third optimization described further below). In some embodiments, a technical advantage of allocating a larger optimization (or testing) budget to the second optimization phase enables a well-developed Pareto-efficient frontier that represents a number of objective function values for the scalarized function that jointly optimizes each of the two competing objective functions. Accordingly, depending on a desired performance of a machine learning model, a selection of an ordered pair of objective function values along the Pareto-efficient frontier for the scalarized function should yield an optimal performance of each of the two competing objective functions of the machine learning model.

Figure 5:
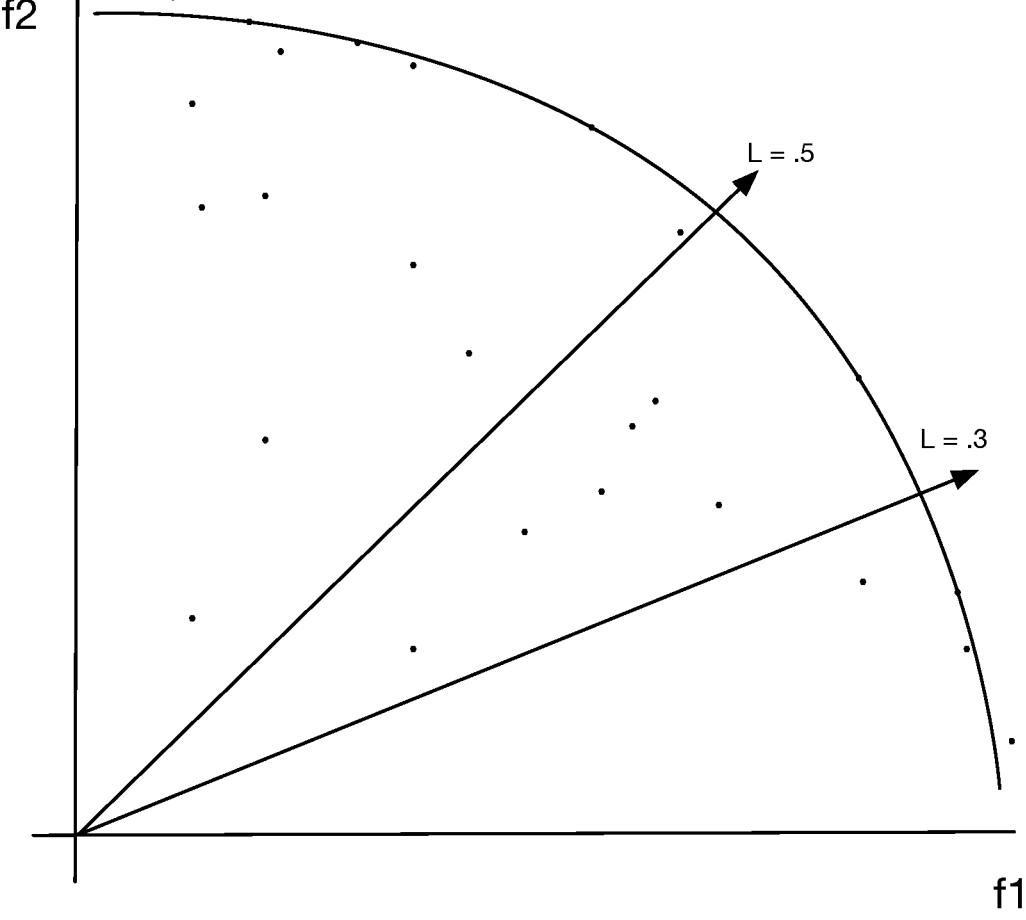
FIG. 5 illustrates a schematic representation of multi-criteria optimization of a scalarization having a convex frontier in accordance with one or more embodiments of the present application.

As shown in FIG. 5, S233 may function to identify a frontier (e.g., a Pareto optimal frontier) by dividing the lambda value of the scalarized function into equal parts (e.g., six equal parts or the like), in one or more embodiments, and sweeping the lambda values between each of the resulting sections of the Pareto optimal frontier. For example, if a range of lambda is between 0 and 1, [0,1], S233 may function to partition the values of lambda into four equal sections (e.g., 0-0.25, 0.26-0.50, 0.51-0.75, and. 76-1). Specifically, in some embodiments, once the range of lambda values of the scalarized function is divided into equal parts, S233 may function to incrementally adjust the lambda value of the scalarized function within each section or sub-range and use the second optimization source to generate or identify objective function values for the scalarized function within each distinct subsection. Accordingly, after each incremental adjustment of the lambda value of the scalarized function within a divided lambda segment, the adjusted scalarized function may be provided as input into the second optimization source for generating or identifying objective function values (i.e., new ordered pairs of x and y values for g (x, y)) or new points for the scalarized function. It shall be noted that while S233 may preferably function to subdivide the total range of lambda values into equal parts, S233 may alternatively divide the total range of lambda values in any suitable manner, including unequally, randomly, or other predetermined manner. For instance, in some embodiments, failure regions for a given scalarized function may be known. In such instance, less or no optimization resources may be allocated to such failure regions by diminishing a lambda-determined search region or by eliminating the region from an optimization search all together. That is, S233 may function to exclude one or more values for lambda in which it may be known or in which there is a probability that corresponding hyperparameter values associated with a region of search set by the one or more lambda values may fail to optimize the scalarized function.

In this second optimization phase, which may also be referred to herein as the lambda sweeping phase, S233 functions to define a frontier of Pareto optimal values for the scalarization function by sweeping (e.g., incrementally adjusting a lambda value from in a range of 0 to 1 or 1 to 0 or the like). Preferably, each point on the frontier includes an ordered pair of the objective functions achievable by the machine learning model. It shall be noted that the Pareto-optimal solutions may not necessarily be unique, as there can be multiple input combinations of objective function values x and y that achieve a desired accuracy of 0.8 and efficiency of 0.2, for example. In some embodiments, the resultant Pareto optimal frontier may typically define a convex arc with a plurality of Pareto optimal values defining the frontier and also, surrounding lower and upper sections of the frontier and with some Pareto optimal values falling on or around the frontier arc.

S230 may additionally or alternatively include S235, which includes implementing a third optimization phase of the objective functions of the scalarized function, functions to provide the scalarized function as input into the second optimization source of the intelligent optimization platform. In this third optimization phase, S235 may function to optimize objective function values of the scalarized function by using extreme values for lambda (e.g., o or near o values and 1 or near 1 values). That is, S235 may function to select and/or adjust the lambda values of the scalarized function to lambda values near or at an upper bound of lambda (e.g., 1) and lambda values near or at a lower bound of lambda (e.g., o). In this way, S235 may function to populate the two edges of the Pareto optimal frontier with optimized objective function values for the scalarized function. Accordingly, the best possible Pareto optimal solutions that best optimizes each of the respective two or more competing objective functions may be represented along the frontier.

S240, which includes identifying Pareto optimal solutions for the objective functions of the scalarized function, functions to construct a graphical representation based on a plurality of pairings of objective function values (e.g., x, y values for g (x, y)) generated for the scalarized function. The graphical representation preferably includes a distribution of points defined by the plurality of pairings of objective function values for the scalarized function. Additionally, or alternatively, the graphical representation of the generated objective function values for the scalarized function preferably has two dimensions in which a first axis may represent values for a first objective function (e.g., $f_1$ (accuracy)) and a second axis may represent values for a second objective function (e.g., $f_2$ (sparsity)) for a given machine learning model.

Within the graphical representation or the like, S240 may, additionally or alternatively, function to identify dominating points within the distribution of points or objective function values that would outperform suboptimal points. S240 may function to identify dominating points in any suitable manner including, but not limited to, identifying clusters and/or areas along the frontier curve having a high density of points. S240 may function to use the identified dominating points to define a frontier curve along which the Pareto optimal solutions for the scalarized function may be found. In one or more embodiments, depending on an input of a lambda (or desired relative importance of the competing objective functions of the convex combination), S240 may function to identify or select objective function values along the frontier curve and return the hyperparameter values that achieve the Pareto optimal objective function values, as suggestions via the intelligent API.

S250, which includes tuning a machine learning model, functions to use the generated or suggested identified hyperparameter values (derived from a selected Pareto optimal objective function values) for the scalarized function to tune and/or otherwise, adjust the machine learning model. In this regard, in one or more embodiments, the identified hyperparameter values for the scalarized function may function to dually optimize both of the competing objective functions of the given machine learning model. That is, Pareto optimal hyperparameter values may function to improve a performance of a first objective function while also improving and/or without sacrificing a performance of a second, competing objective function of the machine learning model.

2.2 Non-Convex Frontier (Epsilon Constraint Method)

In some circumstances, it may be determined that a best fit curve or a frontier curve of the Pareto optimal values for a given scalarization function may not be convex. In these circumstances, implementing an optimization for the Pareto optimal values of a scalarized function by forcing a convex frontier curve onto the objective function values may result in a misidentification of a number of Pareto optimal values for the scalarized function. Accordingly, in a variant of the method 200, S220 may function to configure the intelligent optimization platform into a new optimization mode (e.g., a third mode, epsilon constraint optimization mode) that enables the optimization of a conditionally constrained joint function in which a best fit curve of the Pareto optimal values may not be a convex curve.

Optionally, as a result of one or more measures or preliminary evaluations of two or more objective functions of an optimization work request, S215 may function to generate a signal indicating that two or more of the objective functions of a given machine learning model compete or diverge, when independently optimized (or potentially jointly optimized), and further, indicate an approximation of a type of Pareto optimal curve for a prospective scalarized function of a combination of the two or more competing objective functions or a conditionally constrained joint (combination) function of the two or more competing objective functions. Accordingly, in the circumstances that S215 may approximate a non-convex frontier curve for the prospective joint function, S215 may trigger the epsilon constraint optimization mode of the intelligent optimization platform.

In a variant of 220, S220 may function to configure and/or compute a new conditionally constrained joint function for optimizing the two or more competing objective functions of multi-criteria optimization work request. Preferably, the new conditionally constrained joint function enables the intelligent optimization platform to optimize a first of the two competing objectives of a single machine learning model subject to a second of the two competing objective functions. S220 may additionally or alternatively function to configure a conditionally constrained joint function in which the second of the two competing objectives is made subject to the first of the two competing objective functions.

As an example, in some embodiments, S220 may function to formulate a conditionally constrained joint function of at least two of the two or more competing objective functions of a multi-criteria optimization work request as follows:

Maximize $f_1(x, y)$

Subject to: $f_2(x, y) >= \varepsilon 1, \varepsilon 2, \varepsilon 3, \ldots \varepsilon N$ In this example, the method 200 may function to optimize the objective function $f_1$ subject to one or more epsilon constraints derived from the objective function $f_2$.

In a variant of S231, S231 may function to populate or generate, via a low-discrepancy optimization source or the like, a random distribution of values for the objective functions of the conditionally constrained joint function. In some embodiments, the low discrepancy distribution of objective function values of the conditionally constrained joint function may be generated in S231 and reverted back to processes in S230 in a further optimization mode decisioning or optimization mode selection step. Based on an approximate best fit curve of the objective function values of the conditionally constrained joint function produced by the low discrepancy optimization source, S230 may function to switch a mode of the intelligent optimization source from a single criteria optimization or a basic multi-criteria optimization mode to a multi-criteria optimization/epsilon constraint mode.

In this variant as shown by way of example in FIG. 2A, S230 may additionally or alternatively include S237, which includes deriving epsilon constraint values based on segmenting values of the second objective function. In one embodiment, S237 may function to identify epsilon constraint values by selecting segments or regions along an axis defined by the second objective function (e.g., $f_2$). In one implementation, S230 may function to identify epsilon constraint values by dividing a range of the second objective function (e.g., $f_2$) into plurality of different epsilon constraint levels (e.g., multiple epsilon values, $\varepsilon 1-\varepsilon 6 \ldots$). In performing the segmentation of the second objective function, a maximum and a minimum value of the second objective function may typically be required such that the epsilon constrain levels exist between the maximum and minimum values of the second objective function. In some embodiments, S237 may consider the observed maximum value and the minimum value of the second objective function of the values generated by the low discrepancy optimization source as the maximum and the minimum values of the second objective function. Additionally, or alternatively, in some embodiments, the maximum and minimum values of the second objective function may be provided along with the multi-criteria optimization work request.

In a second implementation, S237 may function to identify epsilon constraint values or levels based on the second objective function based on predetermined and/or known failure regions for the second objective function. In this regard, S237 may function to set one or more of the epsilon constrain values solely based on the identified region in which the second objective function cannot be optimized along with the first objective function. That is, these failure regions include regions in which one or more of the second objective function or the first objective function is degraded when the other of the two competing objective functions is optimized.

Figure 6:
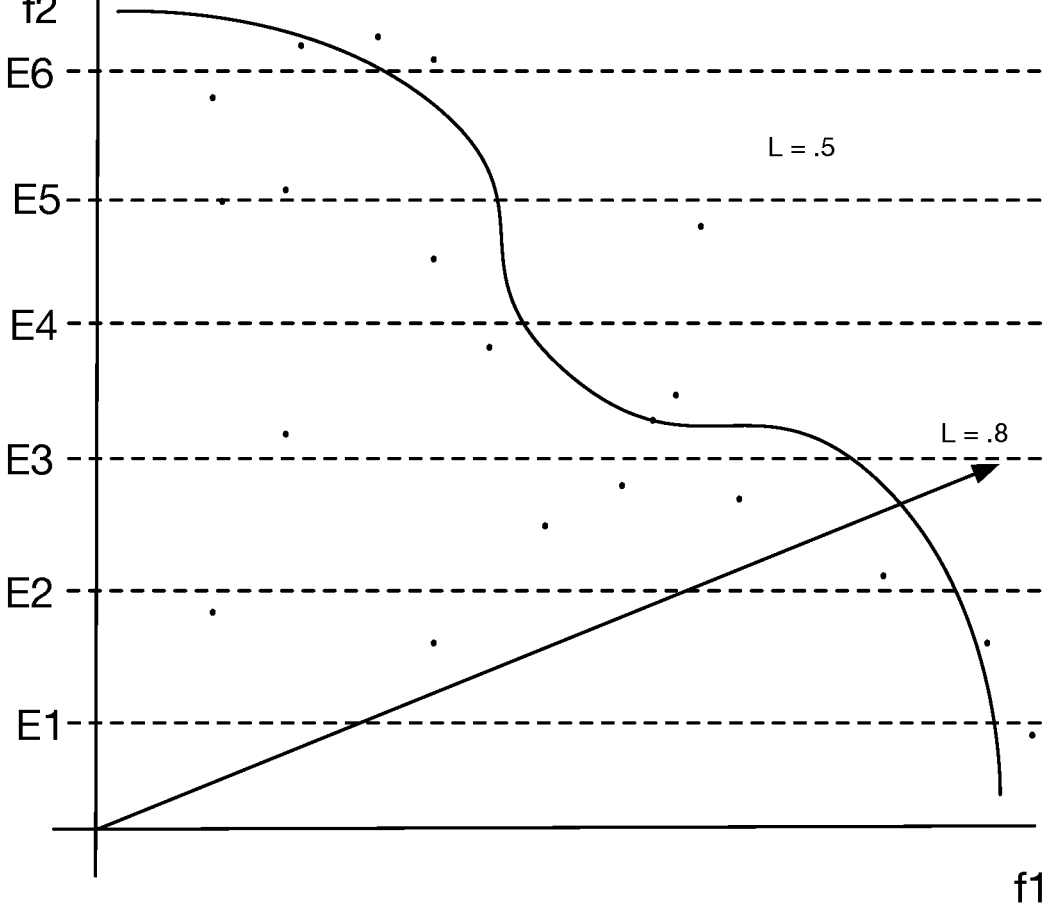
FIG. 6 illustrates a schematic representation of multi-criteria optimization of a scalarization having a non-convex frontier in accordance with one or more embodiments of the present application.

Further with respect to this variant, S230 may additionally or alternatively include S239, which functions to progressively set epsilon constraint values for optimizing the first objective function. In one embodiment, S239 functions to use the epsilon constraint values, preferably derived from the second objective function, to progressively set exploration and/or optimization regions for the first objective function, as shown by way of example in FIG. 6.

In use, S239 may function to set a first epsilon constraint value (e.g., $\varepsilon 1$) and provide the first epsilon constraint value and the conditionally constrained joint function as optimization input into the second optimization source of the intelligent optimization platform. By setting the first epsilon constraint value, S239 effectively defines or sets a failure region that causes the second optimization source to optimize the objective functions of the conditionally constrained joint function in a region other than the failure region. Specifically, in some embodiments, the second optimization source may function to optimize for values of the objective functions above the first epsilon constraint value. Accordingly, in such embodiments, any points below the first epsilon constraint value may be dropped by the second optimization source as non-compliant or otherwise, non-optimal or failing values.

It shall be noted that while setting an epsilon constraint typically functions to set a failure region below the identified or the selected epsilon constraint value, in one or more different embodiments, an epsilon constraint value may be selected or set that set a region above or laterally (to the left or right) of the selected epsilon constraint value to failure.

Accordingly, S239 may function to progressively set the epsilon constraint values (e.g., ci and onward) until the non-convex frontier curve and the plurality of optimized values for the objective functions of the conditionally constrained joint function surrounding the non-convex frontier curve are discovered. That is, S239 may function to discover the dominant points of the non-convex curve associated with the optimized conditionally constrained joint function.

S240, which includes identifying Pareto optimal solutions for the hyperparameters of the conditionally constrained joint function, functions to construct a graphical representation based on a plurality of pairings of objective function values generated for the conditionally constrained joint function.

S250, which includes tuning a machine learning model, functions to use the identified or suggested hyperparameter values (derived from a selected pairing of objective function values) for the conditionally constrained joint function to tune and/or otherwise, adjust the machine learning model.

One or more instances of the method and/or processes described herein can be performed asynchronously (e.g., sequentially), concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system comprising:
interface circuitry to access a tuning work request; and
programmable circuitry to tune original hyperparameters of a prediction machine learning (ML) model based on the tuning work request, the programmable circuitry to:
access user input associated with the tuning work request, the user input specifying performance metrics of the prediction ML model;
perform, in parallel, hyperparameter optimization on a plurality of candidate models based on a budget associated with the user input, the hyperparameter optimization to map hyperparameter values of the plurality of candidate models to the performance metrics;
obtain a plurality of hyperparameter values by executing a plurality of hyperparameter optimization models, the plurality of hyperparameter values corresponding to respective prediction accuracies and prediction speeds of candidate prediction models utilizing respective ones of the plurality of hyperparameter optimization models;
compute, based on an objective function, a plurality of combinations of the respective prediction accuracies and prediction speeds of the respective ones of the plurality of hyperparameter values;
select one of the plurality of hyperparameter values based on a comparison of the combinations, a prediction accuracy of the prediction ML model, and a prediction speed of the prediction ML model; and
update the prediction ML model to replace the original hyperparameter values with the selected one of the plurality of hyperparameter values.

2. The system of claim 1, wherein the programmable circuitry includes a plurality of distributed computers, the distributed computers to perform the tuning of the hyperparameters.

3. The system of claim 1, wherein the programmable circuitry implements a tuning service.

4. The system of claim 1, wherein the ML model is at least one of a random search model, a Tree Parzen Estimation (TPE) model, or a reinforcement learning based model.

5. The system of claim 1, wherein the programmable circuitry is to determine a joint function that facilitates simultaneous optimization of a first accuracy metric and a first prediction speed metric.

6. The system of claim 1, wherein the programmable circuitry is to change a tuning value to increase an emphasis of the optimization of a first accuracy metric and also decrease an emphasis of a first prediction speed metric.

7. The system of claim 1, wherein the programmable circuitry is to cause presentation via a display of a first accuracy metric and a first prediction speed metric corresponding to a first candidate model and a second accuracy metric and a second prediction speed metric corresponding to a second candidate model.

8. The system of claim 1, wherein the interface circuitry is an application programming interface.

9. The system of claim 1, wherein the programmable circuitry is to select a first hyperparameter values based on calculation utilizing two dimensional objective functions in which the accuracy is a first dimension and the prediction speed is a second dimension.

10. The system of claim 1, wherein the programmable circuitry is to perform the hyperparameter optimization on the plurality of candidate models based on the budget by dividing the budget among three phases, wherein the phases include three different sweeps.

11. The system of claim 10, wherein the three different sweeps are: a quasi-random sweep of hyperparameter values, a sweep of groups of hyperparameter values, and a search of hyperparameter values that maximizes one objective at a time.

12. The system of claim 11, wherein a portion of the budget allocated to the sweep of groups of hyperparameter values is greater than portions of the budget allocated to the quasi-random sweep of hyperparameter values and the search of hyperparameter values that maximizes one objective at a time.

13. A computer-readable storage device or storage disk comprising instructions to cause programmable circuitry to at least:
access user input associated with a tuning work request, the user input specifying performance metrics of a prediction machine learning (ML) model;
perform, in parallel, hyperparameter optimization on a plurality of candidate models based on a budget associated with the user input, the hyperparameter optimization to map hyperparameter values of the plurality of candidate models to the performance metrics;
obtain a plurality of hyperparameter values by executing a plurality of hyperparameter optimization models, the plurality of hyperparameter values corresponding to respective prediction accuracies and prediction speeds of candidate prediction models utilizing respective ones of the plurality of hyperparameter optimization models;

compute, based on an objective function, a plurality of combinations of the respective prediction accuracies and prediction speeds of the respective ones of the plurality of hyperparameter values;

select one of the plurality of hyperparameter values based on a comparison of the combinations, a prediction accuracy of the prediction ML model, and a prediction speed of the prediction ML model; and update the prediction ML model to replace the original hyperparameter values with the selected one of the plurality of hyperparameter values.

14. The computer-readable storage device or storage disk of claim 13, wherein the instructions are to cause the programmable circuitry to perform the hyperparameter optimization using a plurality of distributed computers.

15. The computer-readable storage device or storage disk of claim 13, wherein the instructions are to cause the programmable circuitry to implement a tuning service.

16. The computer-readable storage device or storage disk of claim 13, wherein the ML model is at least one of a random search model, a Tree Parzen Estimation (TPE) model, or a reinforcement learning based model.

17. The computer-readable storage device or storage disk of claim 13, wherein the instructions are to cause the programmable circuitry to determine a joint function to facilitate simultaneous optimization of a first accuracy metric and a first prediction speed metric.

18. The computer-readable storage device or storage disk of claim 13, wherein the instructions are to cause the programmable circuitry to change a tuning value to increase an emphasis of the optimization of a first accuracy metric and also decrease an emphasis of a first prediction speed metric.

19. A method to tune hyperparameters of a prediction machine learning (ML) model based on a tuning work request, the method comprising:

accessing user input associated with the tuning work request, the user input specifying performance metrics of the prediction ML model;

performing, by executing an instruction with programmable circuitry, hyperparameter optimization on a plurality of candidate models, in parallel, based on a budget associated with the user input, the hyperparameter optimization to map hyperparameter values of the plurality of candidate models to the performance metrics;

obtaining, by executing an instruction with the programmable circuitry, a plurality of hyperparameter values by executing a plurality of hyperparameter optimization models, the plurality of hyperparameter values corresponding to respective prediction accuracies and prediction speeds of candidate prediction models utilizing respective ones of the plurality of hyperparameter optimization models;

compute, by executing an instruction with the programmable circuitry, based on an objective function, a plurality of combinations of the respective prediction accuracies and prediction speeds of the respective ones of the plurality of hyperparameter values;

select one of the plurality of hyperparameter values based on a comparison of the combinations, a prediction accuracy of the prediction ML model, and a prediction speed of the prediction ML model; and update, by executing an instruction with the programmable circuitry, the prediction ML model to replace the original hyperparameter values with the first selected one of the plurality of hyperparameter values.

20. The method of claim 19, wherein the hyperparameter optimization is performed by a plurality of distributed computers.

* * * * *